(12) United States Patent
Rognlien et al.

(10) Patent No.: US 11,783,801 B2
(45) Date of Patent: *Oct. 10, 2023

(54) MUSICAL STRING INSTRUMENT NUT AND BRIDGE FILE

(71) Applicant: Music Nomad, LLC, Sonoma, CA (US)

(72) Inventors: Rand Rognlien, Sonoma, CA (US); Pieter Schouten, Berkley, CA (US)

(73) Assignee: Music Nomad, LLC, Sonoma, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/979,523

(22) Filed: Nov. 2, 2022

(65) Prior Publication Data
US 2023/0049892 A1    Feb. 16, 2023

Related U.S. Application Data

(63) Continuation of application No. 17/466,114, filed on Sep. 3, 2021.

(60) Provisional application No. 63/074,154, filed on Sep. 3, 2020.

(51) Int. Cl.
*G10D 3/12* (2020.01)
*B23D 71/08* (2006.01)
*G10D 3/04* (2020.01)

(52) U.S. Cl.
CPC ............... *G10D 3/12* (2013.01); *B23D 71/08* (2013.01); *G10D 3/04* (2013.01)

(58) Field of Classification Search
CPC ... G10D 3/12; G10D 3/04; G10D 3/00; B23D 71/08
See application file for complete search history.

(56) References Cited

U.S. PATENT DOCUMENTS 4,517,874 A * 5/1985 Fender ..................... G10D 3/12
84/214

\* cited by examiner

*Primary Examiner* — Kimberly R Lockett
(74) *Attorney, Agent, or Firm* — George McGuire

(57) ABSTRACT

A file for use in forming a groove in a nut or bridge of a string musical instrument. The file includes a filing edge that is rounded to the same radius as the string to be fitted in the groove it forms in the nut and bridge. A spine or rib is formed along the upper edge of the file to provide stiffening and permitting the file to not bow or flex when being used.

7 Claims, 11 Drawing Sheets

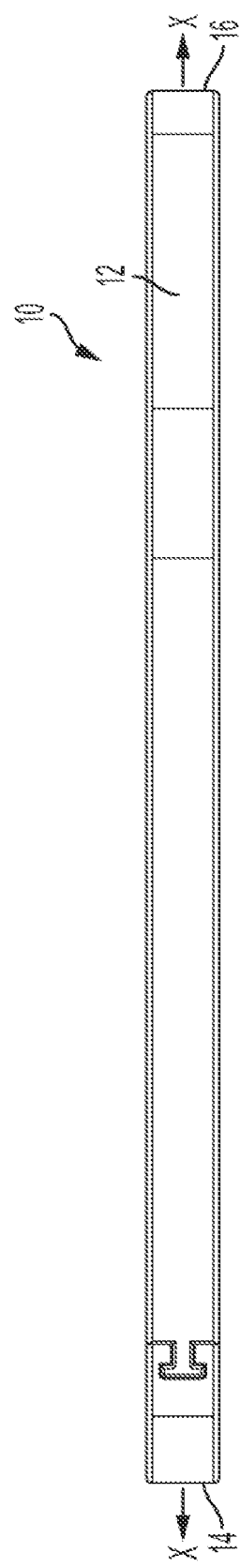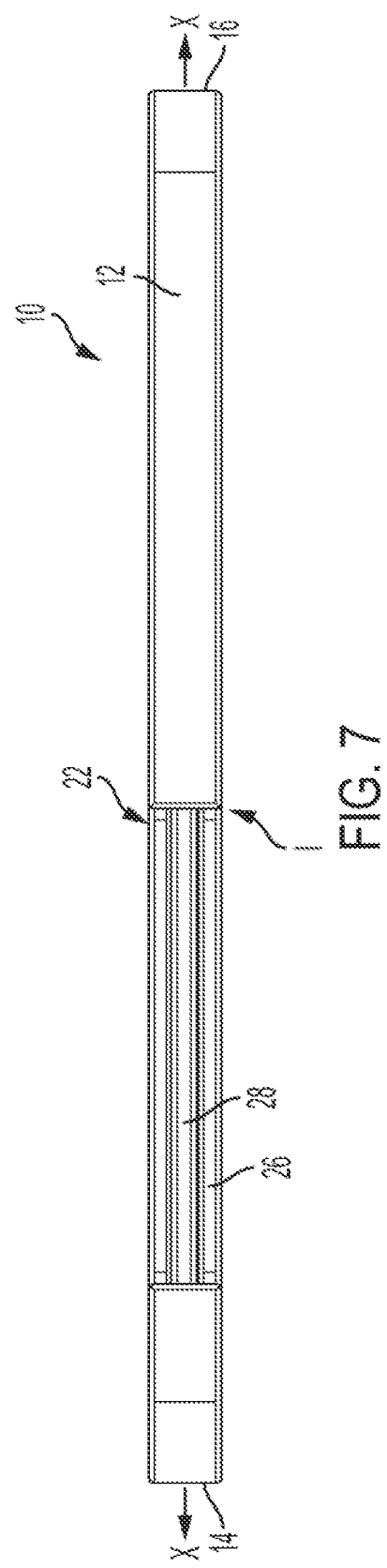

MUSICAL STRING INSTRUMENT NUT AND BRIDGE FILE

CROSS-REFERENCE TO RELATED APPLICATION

The present application is a continuation of U.S. Non-Provisional application Ser. No. 17/466,114, filed Sep. 3, 2021, now allowed, which relates and claims priority to U.S. Provisional Application 63/074,154, filed Sep. 3, 2020, the entirety of each of which is incorporated herein.

FIELD OF THE INVENTION

The present disclosure is directed generally to luthier and musician tools, and more particularly to a file used on a musical string instrument nut and bridge.

BACKGROUND

A nut and bridge on a stringed instrument, such as a guitar, is mounted to the fretboard at its end closest to the headstock. The nut marks one end of the vibrating length of each open string (the bridge defining the other end), while also holding the strings at the proper height from the fretboard (dictating the action of the guitar) and maintains the proper spacing between strings. The nut is composed of a hard material, such as ebony, ivory, bone, or hard plastic.

In order to securely hold each string while maintaining each string's spacing from the others and from the fretboard, grooves or notches are formed in the nut. Each groove or notch corresponds in size to securely hold each string (each of which is of a different diameter), while being of proper depth to space each string the desired distance from the fretboard.

When an instrument is first built, the luthier (or musician if maintaining his or her own instrument) needs to form the grooves in the nut (and bridge), while over time, the nut may need to be replaced and groves formed in the replacement nut. To form the grooves in the nut and bridge, the luthier/musician most often will use a file to remove material from the nut. Different sized files are used to correspond with the differently sized strings. The most typical file is an elongated length of metal extending from a handle and that includes a filing edge, most often a knife-like sharp edge used to remove the material from the nut. Others may use a rounded edge that make it easier to leave a rounded bottom in the groove in which the string sits.

Having the grooves sized with minimal tolerance for the best sound production from the instrument requires precise work by the luthier in forming the grooves. The elongated metal files typically used will sometimes bow due to their length and the forces being imparted by the filing. This bowing can cause imperfections in the groove dimensions resulting in a poorer sounding instrument. The files with the knife-like edge also make it difficult to form a proper seating for the string in the nut.

Accordingly, there is a need in the art for a nut file that provides the necessary rigidity and structural integrity to permit a luthier to form a near perfectly sized groove in a nut and bridge of a musical stringed instrument.

SUMMARY

The present disclosure is directed to a file for a musical string instrument nut and bridge.

According to an aspect is a filing tool for use in forming a groove in a nut and bridge in a musical stringed instrument and in which a string of predetermined diameter is adapted to be seated, comprising an elongated body having an upper surface and a lower surface, and a notch formed in the lower surface that extends for at least a portion of its length; an elongated file securely retained by and extending in parallel with the elongated body, comprising an upper edge and a rounded, lower, filing edge that is exposed within the notch, wherein the upper edge of the elongated file engages and is securely attached within the elongated notch formed in the body.

According to an embodiment, the elongated body includes first and second ends, and a handle portion adjacent the second end, and the notch extends for a predetermined distance from a position adjacent the first end to an intermediate position between the first and second ends and the handle extends to the intermediate position between the first and second ends.

According to an embodiment, the elongated file is coated with diamond.

According to an embodiment, the rounded, lower, filing edge of the elongated file is of a diameter that is of the same dimension and the diameter of the guitar string.

According to an embodiment, the filing tool further comprises a file retaining shim removably attached to the handle.

According to an embodiment, the retaining shim is positioned adjacent the second end of the first end.

According to an embodiment, the retaining shim is positioned at an intermediate position between the first and second ends.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which:

FIG. 6 is a top plan view of a musical string instrument nut and bridge file, in accordance with an embodiment FIG. 7 is a bottom plan view of a musical string instrument nut and bridge file, in accordance with an embodiment

DETAILED DESCRIPTION OF EMBODIMENTS

Figure 1:
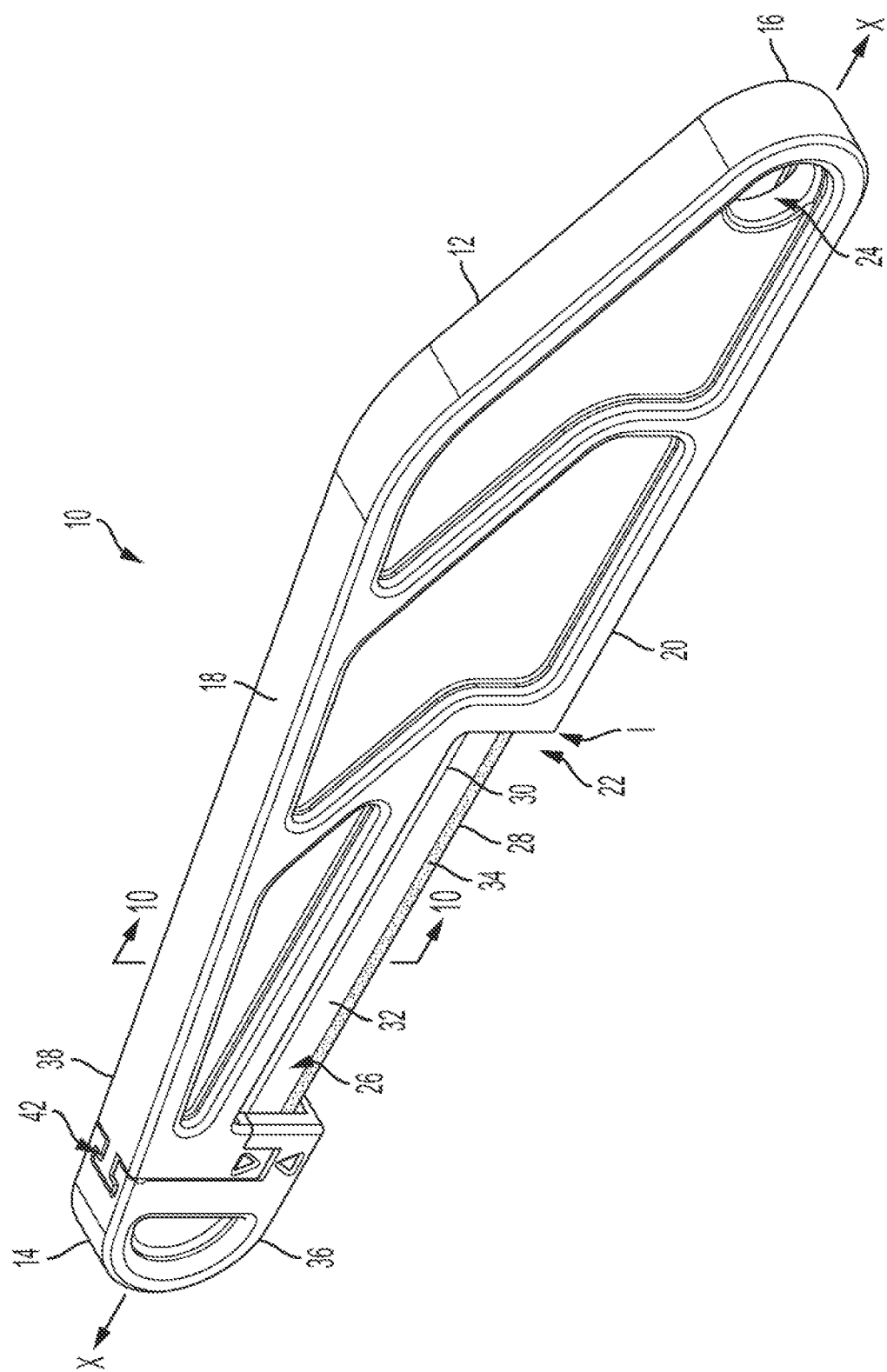
FIG. 1 is a perspective view of a musical string instrument nut and bridge file, in accordance with an embodiment.
Figure 2:
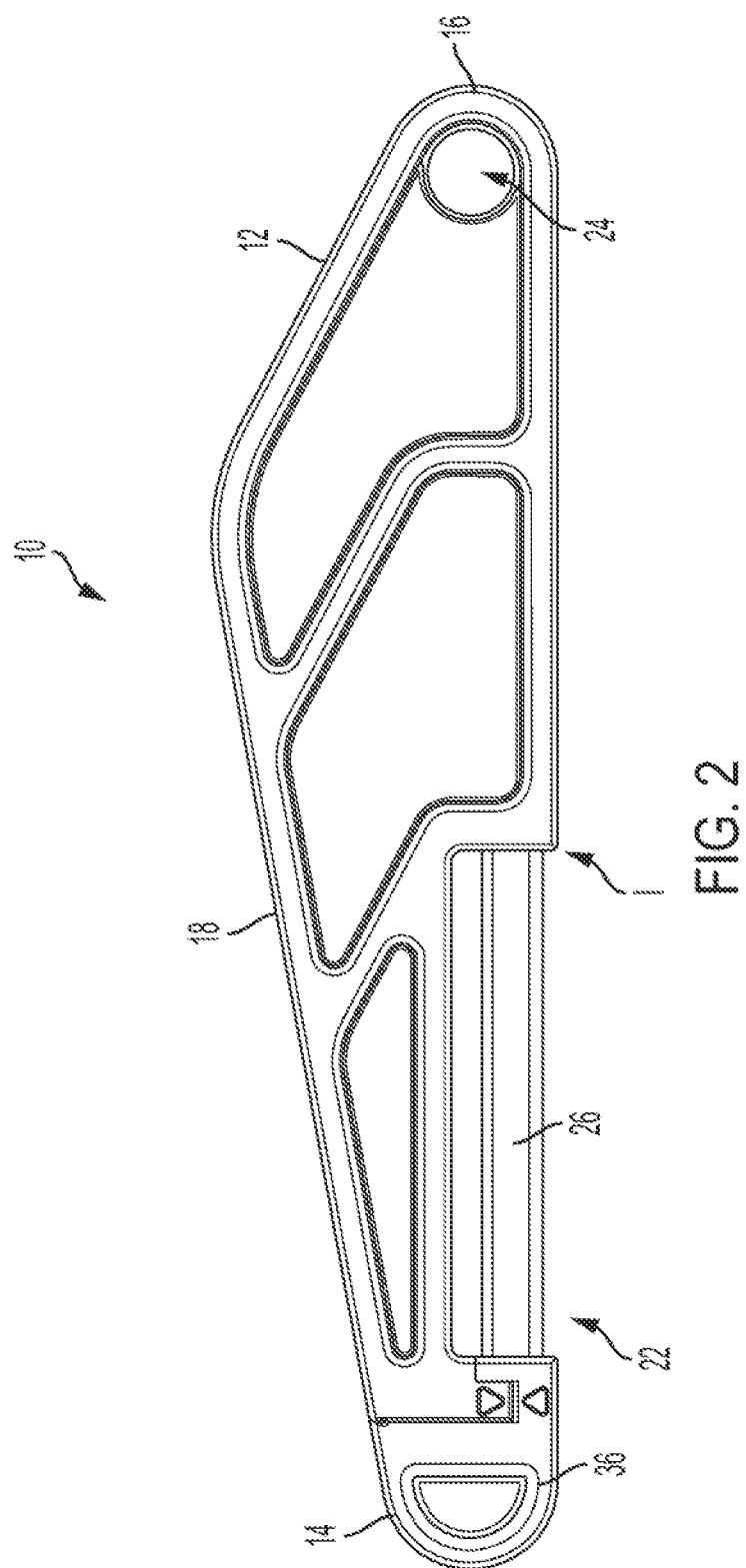
FIG. 2 is a first side elevation view of a musical string instrument nut and bridge file, in accordance with an embodiment.
Figure 3:
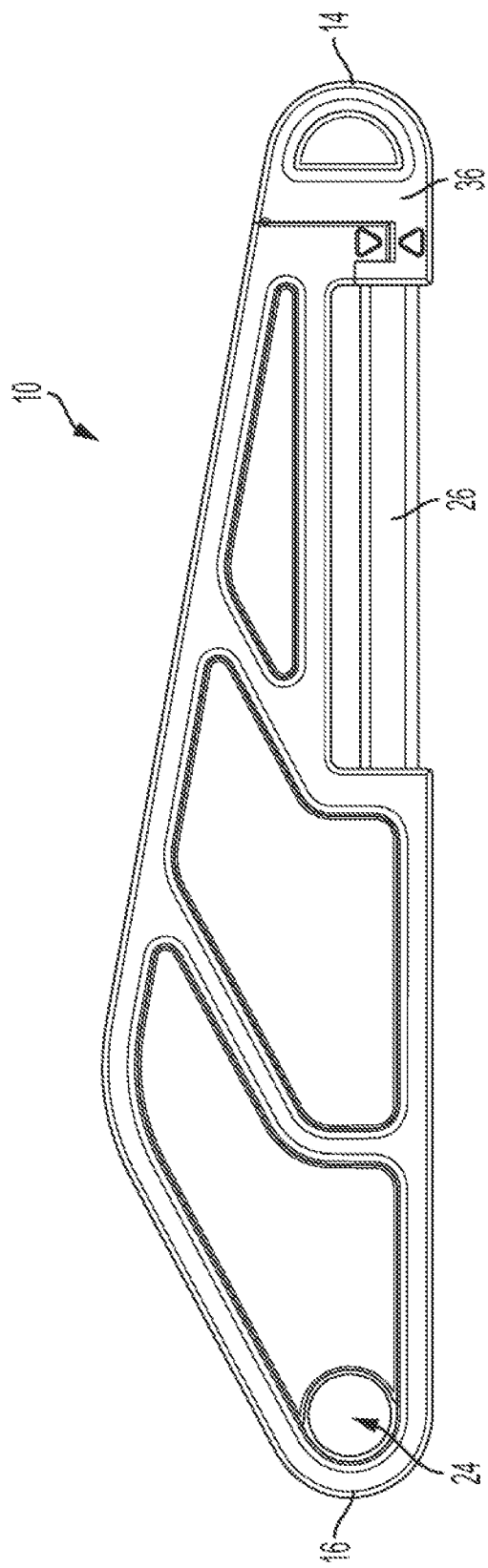
FIG. 3 is a second side elevation view of a musical string instrument nut and bridge file, in accordance with an embodiment.
Figure 5:
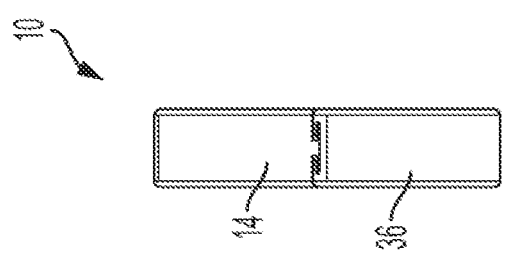
FIG. 5 is a rear elevation view of a musical string instrument nut and bridge file, in accordance with an embodiment
Figure 4:
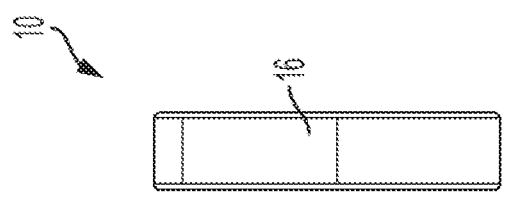
FIG. 4 is a front elevation view of a musical string instrument nut and bridge file, in accordance with an embodiment
Figure 8:
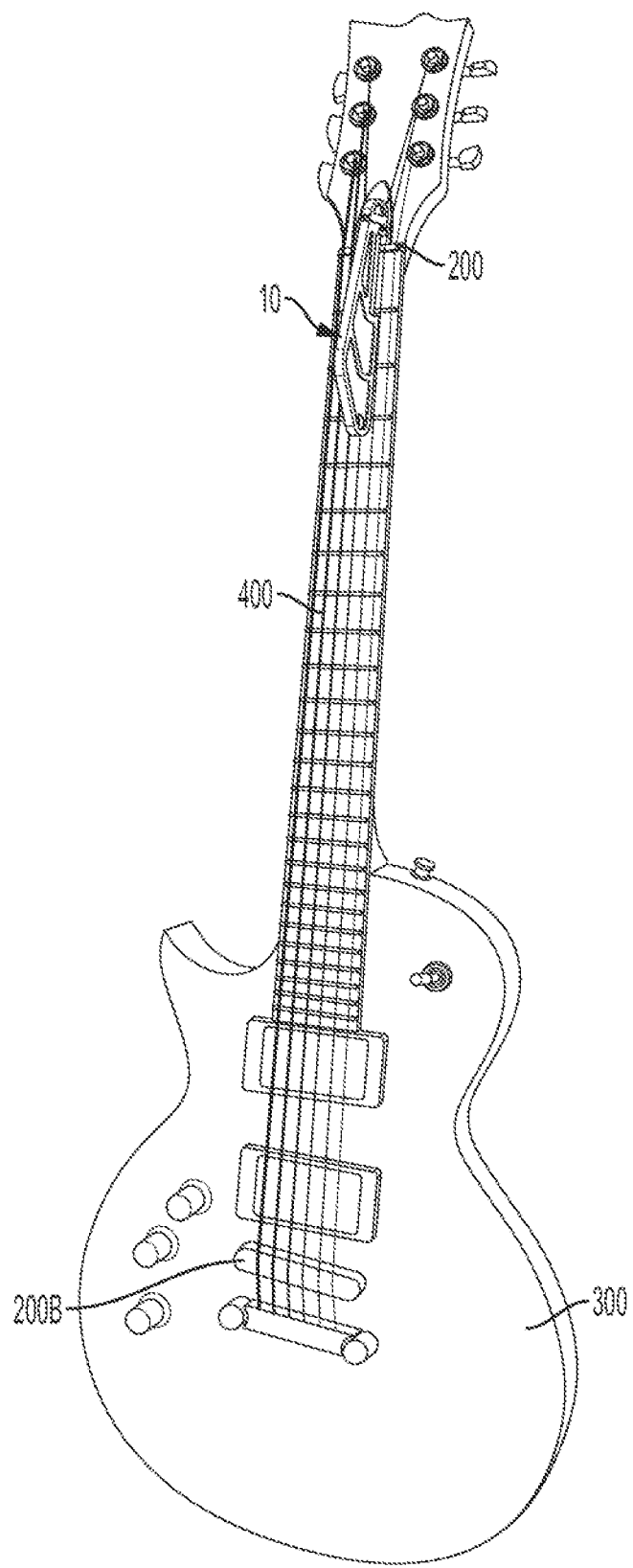
FIG. 8 is a perspective view of a musical string instrument nut and bridge file in use on a guitar nut, in accordance with an embodiment.
Figure 9:
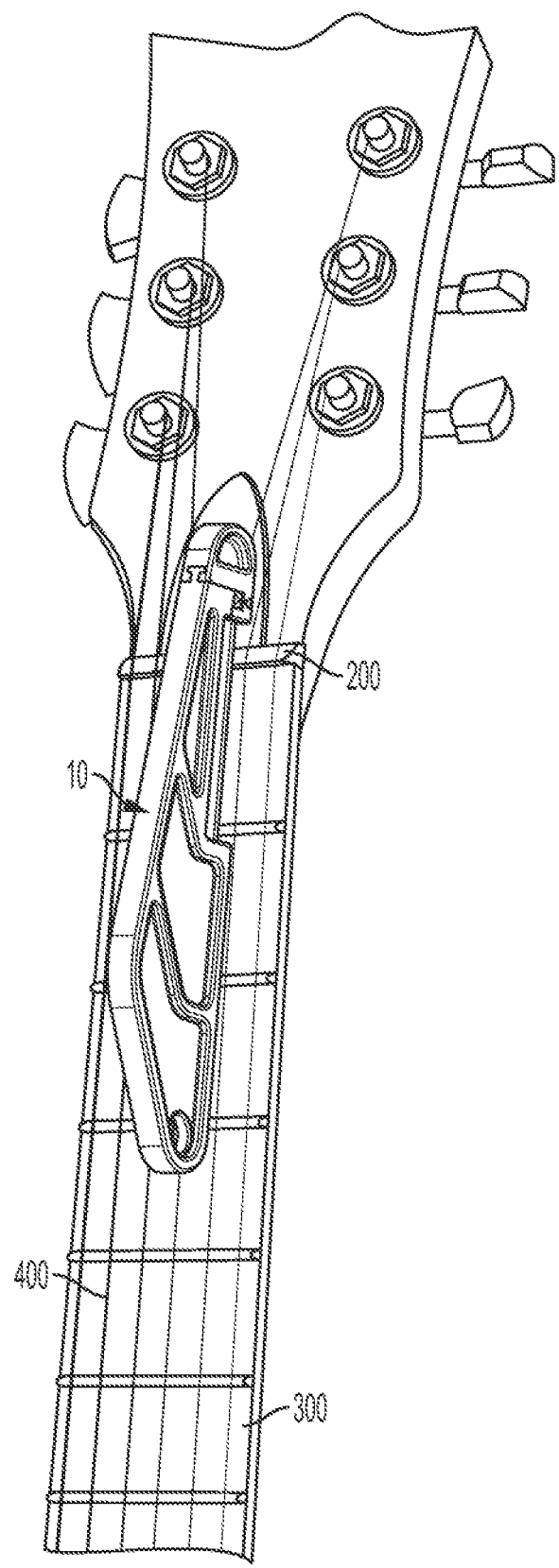
FIG. 9 is an enlarged perspective view of a musical string instrument nut and bridge file in use on a guitar nut, in accordance with an embodiment.
Figure 10:
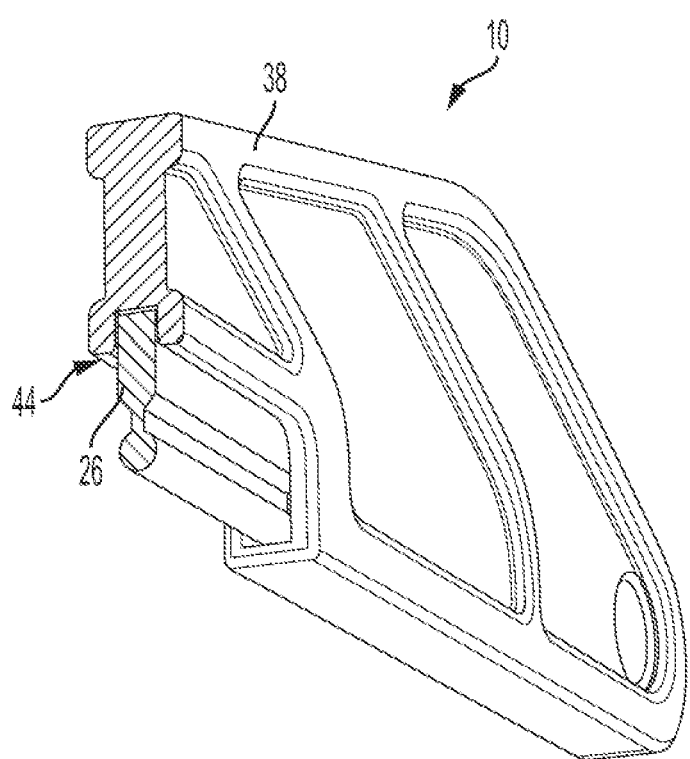
FIG. 10 is a cross-sectional view of a musical string instrument nut and bridge file taken along section line 10-10 of FIG. 1, in accordance with an embodiment.
Figure 11:
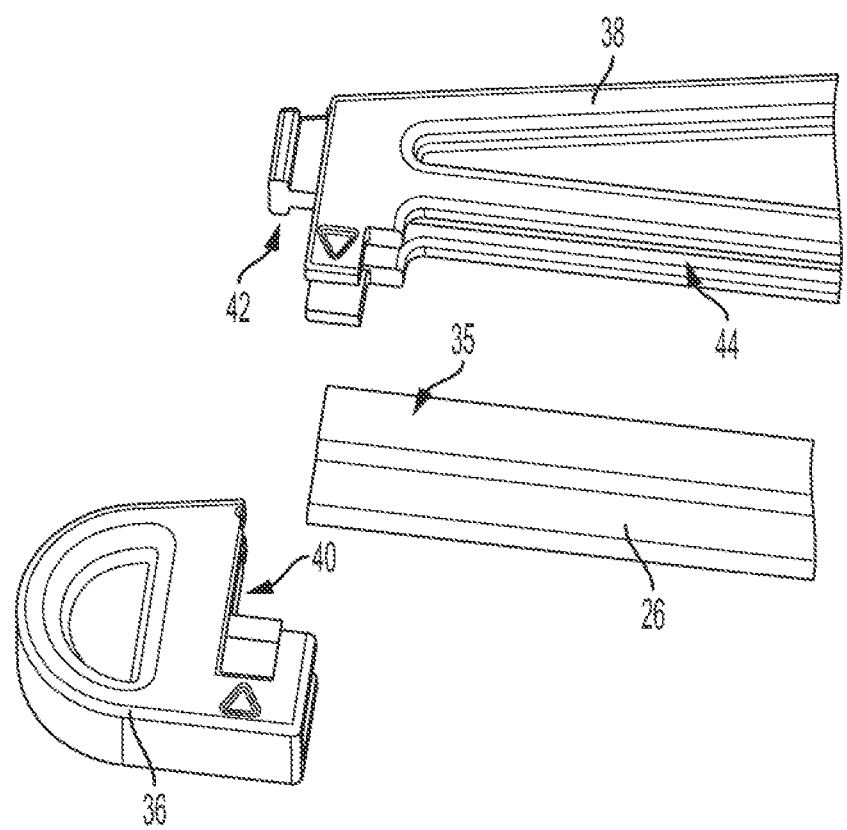
FIG. 11 is an exploded perspective view of a musical string instrument nut and bridge file, in accordance with an embodiment.
Figure 12:
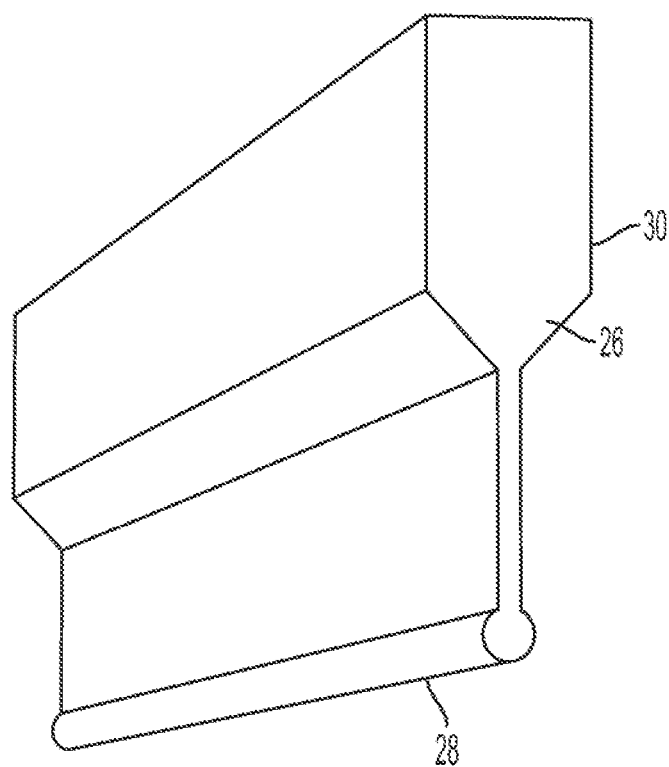
FIG. 12 is a perspective view of a musical string instrument nut and bridge file, in accordance with an embodiment.

The present disclosure describes a filing tool 10 for use in forming a groove 100 in a nut 200 of a guitar 300 (it being understood that the file can be used on the nut (and bridge 200B) of any string instrument, the guitar being shown for exemplary purposes). A guitar string 400 of predetermined diameter is adapted to be seated in nut 200 and each individual string 400 in a guitar 300 will be of a unique diameter.

Referring to FIG. 1, in one embodiment, filing tool 10 extends along a longitudinal axis X-X and comprises a body 12 that extends between first and second ends 14, 16, and upper and lower edges 18, 20. A notch 22 is formed in the lower edge 18 at a position adjacent first end 14 and extending to an intermediate position between the first and second ends 14, 16. An eyelet 24 is formed through body 12 at a position adjacent second end 16 to provide a point from which tool 10 can be hung from a peg or strung on a chain. Body 12 is formed as a triangle, although other shapes are feasible, with the widest part being at a position between second end 16 and the intermediate position I, thereby providing a suitable handle the user can grasp when using tool 10.

An elongated file 26 is retained within body 12 and positioned within notch 22 with its filing edge 28 being exposed along the open bottom of notch 22. The filing edge is rounded to a diameter that is substantially the same as the radius/diameter as the string 400 to be seated in nut 200; with the rounding, the file has over 180 degrees of filing ability (i.e. to file nut 200 to retain 6 differently sized strings, six different files would be used with each file having a rounded filing edge that matches the radius/diameter of the particular string). To stabilize file 26, a rib/spine 30 is either integrally formed along the spine of file 26 or is a separate stiffening piece that also retained within body 12 and positioned within notch 22 and envelops the upper edge of file 26 leaving a portion of the sidewalls 32 and the filing edge 28 of file 26 exposed. In addition, in an embodiment, to extend the length of file 26, it can be reversed so that the opposite edge can serve as the filing edge.

Alternatively, file 26 and rib 30 could be provided and used separate and apart from body 12. Such separate use would, for example, be useful when a luthier is performing a sensitive filing that requires extreme precision making direct contact with the file a more useful manner of performing the filing.

File 26 is manufactured, preferably, by an EDM process to provide a relatively short and stiff file that does not bow or flex when used in the normal course. After manufacturing the file 26, it is coated (through an adhering process) with a diamond dust 34 to improve its hardness and filing efficiency. The diamond dust is preferred as it bites into the nut 200 immediately upon filing and does not skip when starting a cut/slot on the nut 200. In addition, the radius/diameter dimension 35 can be etched or otherwise printed on the file 26.

Body 12 comprises a nose 36 that forms the front edge 14 and connects to the main body 38. Nose 36 includes a groove 40 formed therein that cooperates/mates with a corresponding flange 42 formed at the leading edge of main body 38 to connect the two pieces together. Moreover, nose 36 can be detached from main body 38 to permit removal/replacement of file 26 in body 12. The upper edge of file 26 fits within a slot 44 formed in main body 38 and permits sliding engagement of file 26 in body 12.

Figure 13:
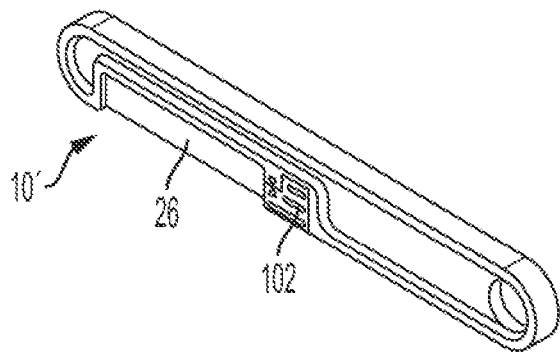
FIG. 13 is a perspective view of a musical string instrument nut and bridge file, in accordance with an embodiment.
Figure 14:
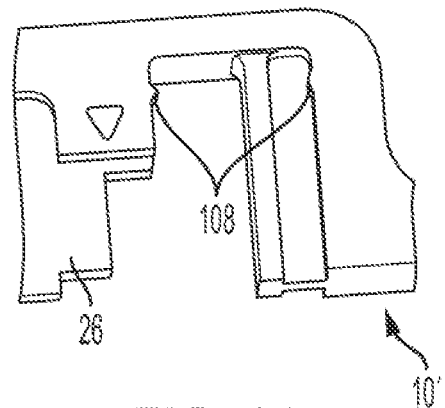
FIG. 14 is a partial, enlarged perspective view of the file retaining shim, in accordance with an embodiment.
Figure 15:
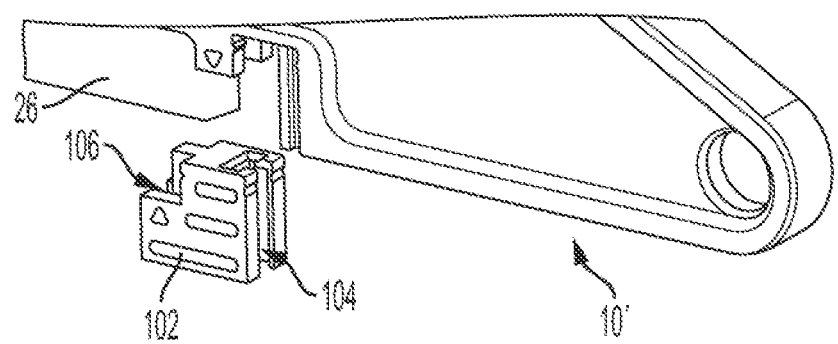
FIG. 15 is an exploded, partial perspective view of the file retaining shim, in accordance with an embodiment.

Referring to FIGS. 13, 14 and 15, an alternate embodiment of the file retaining shim is shown. The filing tool 10' is the same as filing tool 10 except for the manner in which the file 26 is inserted into/withdrawn from and retained within the tool 10'. In tool 10', a retaining shim 102 is positioned for sliding engagement with the body/handle of tool 100 at an intermediate position between ends 14' and 16', instead of being positioned at the nose of the tool as with tool 10. This permits the nose of tool 10' to be shortened with less overhang and the profile of the handle changed to more of a straight inline version.

Retaining shim 102 includes a notch 104 that is positioned along one edge and engages a correspondingly shaped notch in handle 12', and a second notch 106 positioned on the opposite edge and engages a correspond shaped notch formed in file 26 and handle 12'. A raised bump 108 is formed on each of the handle's two notches at a position slightly along the length of the notch, wherein the bump 108 corresponds with the profile of the notch formed in the shim and allows the shim to click over and be securely retained in position when fully inserted within the notches of the handle. By forcingly disengaging the shim 102 from handle 12' by moving the shim over the bumps 108, file 26 can then be removed and rotated and/or replaced with a different file, and then the shim can be reinserted into the notches to attach to handle 12', as illustrated in FIG. 15.

It should be noted that any number of retaining shims could be used to retain file 26 within file 10/10' (e.g., both the nose positioned shim of tool 10 as well as the intermediate positioned shim 102 of tool 10' could be employed).

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A filing tool for use in forming a groove in a nut and bridge in a musical stringed instrument and in which a string of predetermined diameter is adapted to be seated, comprising:
   a. an elongated body having an upper surface and a lower surface, and a notch formed in the lower surface that extends for at least a portion of its length;
   b. an elongated file securely retained by and extending in parallel with the elongated body, comprising an upper edge and a rounded, lower, filing edge that is exposed within the notch, wherein the upper edge of the elongated file engages and is securely attached within the elongated notch formed in the body.

2. The filing tool according to claim 1, wherein the elongated body includes first and second ends, and a handle portion adjacent the second end, and the notch extends for a predetermined distance from a position adjacent the first end to an intermediate position between the first and second ends and the handle extends to the intermediate position between the first and second ends.

3. The filling tool according to claim 1, wherein the elongated file is coated with diamond.

4. The filing tool according to claim 1, wherein the rounded, lower, filing edge of the elongated file is of a diameter that is of the same dimension and the diameter of the string.

5. The filing tool according to claim 1, further comprising a file retaining shim removably attached to the handle.

6. The filing tool according to claim 5, wherein the retaining shim is positioned adjacent the second end of the first end.

7. The filing tool according to claim 5, wherein the retaining shim is positioned at an intermediate position between the first and second ends.

* * * * *